May 11, 1954

M. McMATH 2,678,417

BATTERY-CAPACITOR POWER UNIT

Filed Oct. 11, 1952

INVENTOR.
BY MARL McMATH

*J. Warren Kinney, Jr.*
ATTORNEY

May 11, 1954 M. McMATH 2,678,417
BATTERY-CAPACITOR POWER UNIT
Filed Oct. 11, 1952 2 Sheets-Sheet 2

INVENTOR.
BY MARL McMATH
ATTORNEY

Patented May 11, 1954

2,678,417

UNITED STATES PATENT OFFICE 2,678,417

BATTERY-CAPACITOR POWER UNIT

Marl McMath, Newport, Ky., assignor to J. Warren Kinney, Jr., Cincinnati, Ohio

Application October 11, 1952, Serial No. 314,288

6 Claims. (Cl. 320—1)

This invention relates to a battery-capacitor power unit.

An object of the invention is to provide a battery-capacitor power unit which is dimensioned to be received within the battery casing of a conventional battery operated photographic flash bulb device.

Another object of the invention is to provide a battery-capacitor power unit which includes a housing constructed and arranged to permit ready replacement of batteries.

Still another object of the invention is to provide a battery-capacitor power unit, the overall length dimension of which is a multiple of the length dimension of a standard dry cell, which my power unit replaces, and wherein the diameter of said unit approximates the diametric dimensions of the replaced dry cells.

A further object of the invention is to provide a universal type battery capacitor power unit which may be associated with the battery case of a two or three dry-cell battery operated ignition type photoflash lamp assembly, thereby greatly enhancing its overall utility.

Still a further object of the invention is to provide a universal battery-capacitor unit which includes a first and second housing which are telescopically engageable for adapting the unit for use within the battery case of either a conventional two or three dry-cell battery operated ignition type photoflash lamp assembly.

Another object of the invention is to provide a battery capacitor unit wherein the capacitor is permanently housed within one end thereof, and wherein a battery may be removably associated with said unit and capacitor, it being understood that the life of the capacitor is many times that of a battery. This construction enables the user of the power unit to simply, quickly, effectively and inexpensively change batteries without requiring the use of special tools and without having to return the unit to the factory or service shop for battery replacement.

These and other objects are attained by the means described herein and as disclosed in the accompanying drawings, in which.

Figure 6:
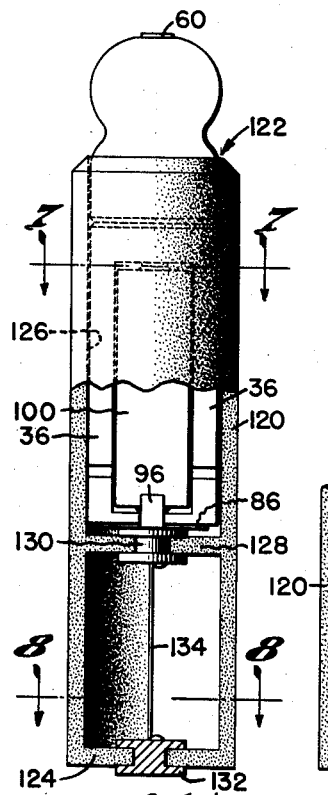
Fig. 6 is a plan view, parts of which have been broken away for clarity of detail and understanding, of a battery-capacitor power unit of Fig. 4, operatively associated with a second housing for adapting the power unit of Fig. 4 to replace a three dry-cell battery combination.

Fig. 10 discloses a modified type of construction of the lower portion of the outer housing of the device illustrated in Fig. 6.

Figure 11:
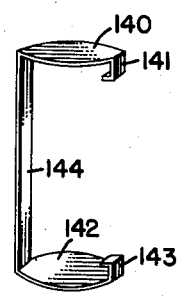
Figure 8:
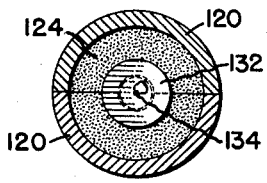
Fig. 8 is a sectional view taken on line 8—8 of Fig. 6.

Fig. 11 is a perspective view of the electric contact strip of Fig. 10.

For the past decade so-called "B-C" or battery-capacitor power units have been used, particularly in the photographic industry, for providing a ready source of power, in lieu of dry-cells, per se, for firing ignition type photoflash lamps.

Two problems have confronted the users of such battery-capacitor power units; the inability to conveniently replace the battery portions of the circuit when they become inefficient, and the inability of such units to be interchangeably used with two and three dry-cell battery housings.

One of the primary objects of the present invention is to provide a highly compact, easy to use battery-capacitor power unit, the battery of which may be quickly removed and replaced by even a child, and which device may be associated with the battery case of either a conventional two or three dry-cell battery operated ignition type photoflash lamp assembly.

Figures 1, 2:
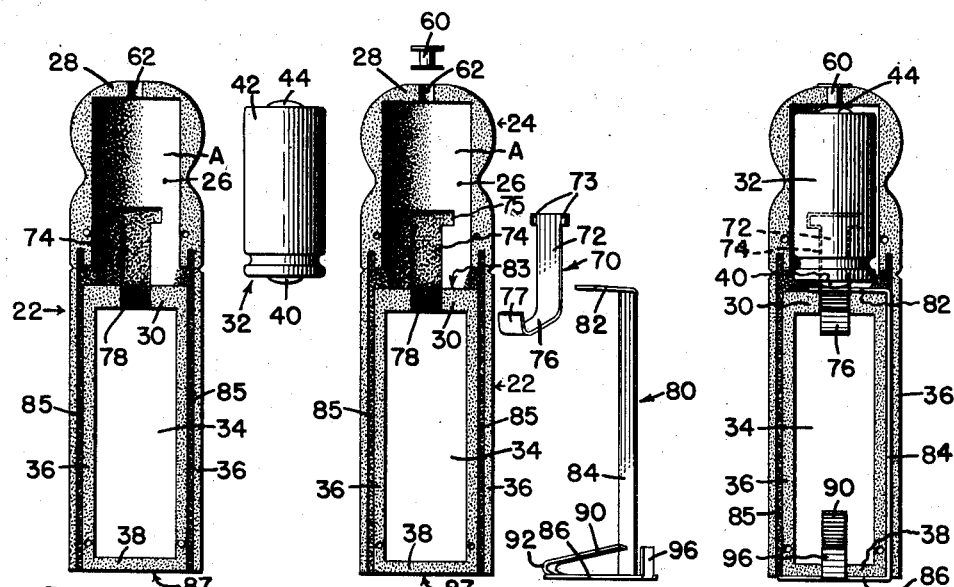
Fig. 1 is a plan view of the various component parts of a battery-capacitor power unit.
Fig. 2 is a view of certain of the parts of Fig. 1 partially assembled ready for placing of the left half-section of the housing of Fig. 1 thereunto.
Figures 3, 4, 5:
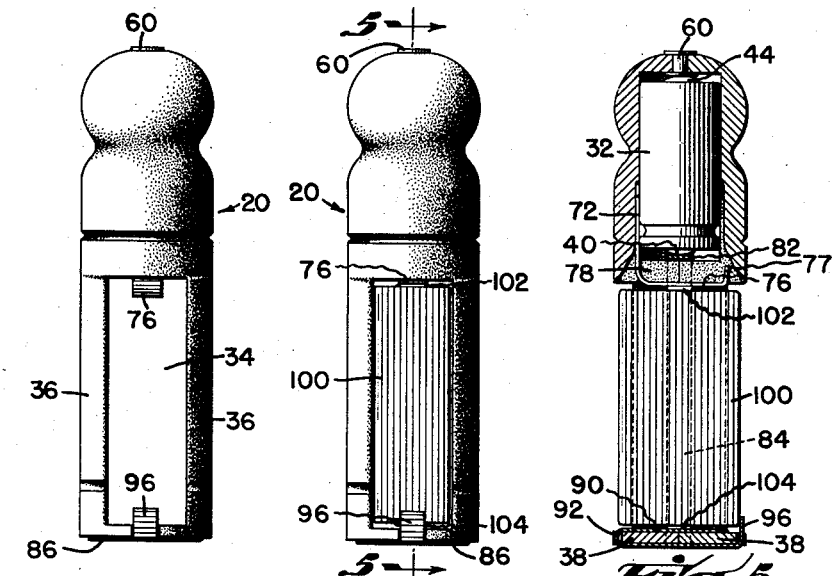
Fig. 3 is a side plan view of a completed battery-capacitor power unit embodying the teachings of the present invention.
Fig. 4 is a view similar to Fig. 3 but showing a battery associated therewith.
Fig. 5 is a sectional view on line 5—5 of Fig. 4.

As best illustrated in Figs. 3 and 4, the power unit comprises a substantially tubular housing 20 of dielectric material, said housing comprising, as best illustrated in Fig. 1, a pair of complementary, duplicate, longitudinal half sections 22 which are adapted to be permanently secured in facial engagement for providing the completed unit of Figs. 3 and 4.

Each of the half sections 22 includes complementary upper portions 24 which include and are defined by substantially continuous annular side walls 26, and upper and lower end walls 28 and 30 which define an area A in which a capacitor 32 is receivable.

The complementary housings likewise include an open sided, closed ended, substantially U-shaped lower portion 34 integral with and depending from upper portion 24, wherein said lower portions are defined by a pair of laterally spaced side walls 36 which terminate at their lower ends in a lower wall 38, for thereby defining an open sided housing in which a conventional 22½ volt "B" type hearing aid battery is removably receivable.

Capacitor 32 is of the type which includes a forward terminal 40 insulated from and having a metal shell 42 forming a second terminal. The metal shell 42 is in series circuit with rearward terminal 44.

A contact element 60 is receivable within apertures 62 of the upper portions of the complementary sections 22 being secured to, carried by and projecting outwardly thru upper end wall 28 of the unit when the complementary halves have been assembled.

A resilient contact member 70 has a first leg 72 adapted to be received within a complementary hollow portion 74 in the upper portion A of the shell halves 22 for making frictional, resilient contact with metal shell 42 of the capacitor 32 housed within chamber A, note Fig. 5. Preferably the free end of leg 72 is provided with outwardly extending ears 73 receivable in lateral extensions 75 of recessed portion 74 for thereby precluding accidental or unintentional displacement of contact member 70. A second leg 76 is disposed and projects downwardly into the upper portion of the battery receptive area 34, portions of first leg 72 projecting downwardly thru lower wall 30 thru slot 78, note Figs. 1 and 5. Preferably the free end of leg 76 is turned up as at 77 to facilitate the introduction of a battery therebelow.

A second resilient contact member 80 including a first leg 82, a second leg 84 and a third leg 86 is associated with the lower portion of the shell halves 22 whereby leg 82 is located in the bottom of capacitor chamber A overlying the upper face 83 of lower wall 30 and in frictional contact with the forward terminal 40 of the capacitor, note Figs. 2 and 5. The second leg 84 is housed within complementary slots 85 provided in side walls 36 of the lower member for disposing the third leg 86 in overlapping relationship with the outer face 87 of lower wall 38, said third leg 86 comprising the second contact element of the unit, the first contact element being denoted by the numeral 60 at the opposite end of the housing.

A resilient contact member 90 formed integral with third leg 86 extends upwardly around the outer edge of lower wall 38 as at 92, note Fig. 5, and projects upwardly into said lower portion above lower wall 38. The opposite terminals 102 and 104 of a battery 100, received within the open lower portion 34 of the housing, will be resiliently engaged by and between contact members 72 and 90 for thereby placing the capacitor in series circuit with the battery. It should, of course, be noted that the positive terminal of battery 100 should be in series circuit with the positive terminal of the capacitor.

In the preferred embodiment of the invention, an abutment or stop member 96 may be formed integral with the third leg 86 and in diametric relationship with the contact member 90 for thereby providing a stop member engageable by the lower edge of battery 100, note Fig. 5.

From the foregoing, it will be noted that I have provided a simple, highly compact battery-capacitor power unit, the capacitor of which is permanently associated therewith, whereas the battery may be easily removed and replaced, at the whim of the user.

Figure 9:
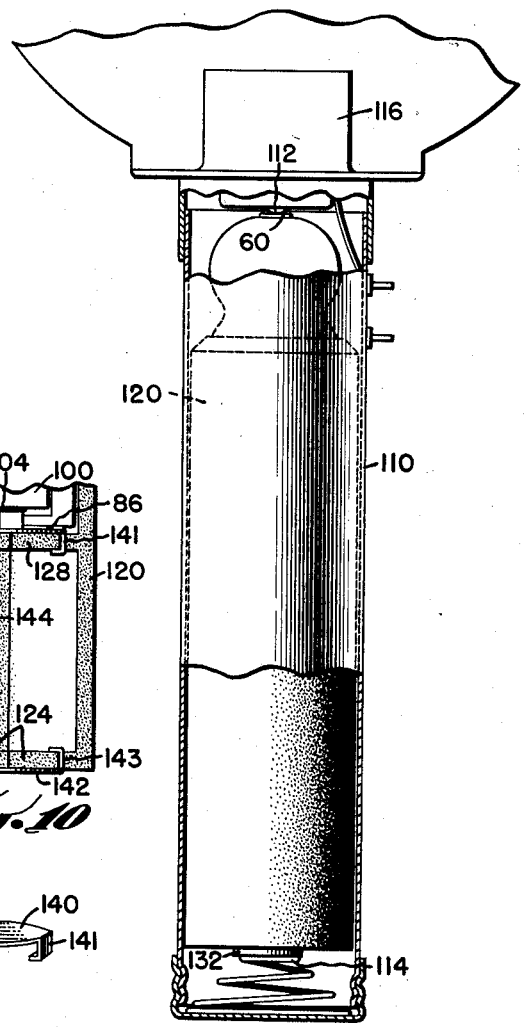
Fig. 9 is a partial side view of a typical three dry-cell battery case of a battery operated ignition type photoflash lamp assembly showing the device of Fig. 6 operatively associated therewith.
Figure 7:
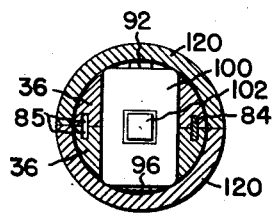
Fig. 7 is a sectional view on line 7—7 of Fig. 6.

With reference now to Fig. 9, the numeral 110 denotes the battery case of a conventional three dry-cell battery operated ignition type photoflash assembly, wherein the numerals 112 and 114 denote respectively the opposed contact members of the assembly, it being understood that these contact elements are suitably connected to opposed electrodes within flash bulb receptacle 116.

In the preferred embodiment of the invention, the length characteristics of the power unit illustrated in Figs. 1–5 is of a dimension substantially equal to the combined end-to-end length of the dry cells of a two dry-cell battery operated ignition type photoflash lamp assembly, and the diameter of the power unit approximates the outer diameter of said batteries, whereby said device may be inserted into the battery case of a two dry-cell battery assembly for converting the device from battery operation to battery-capacitor operation.

In order to efficiently adapt the power unit of Figs. 1–5 for use with the battery case of a conventional three dry-cell assembly, I have provided a second housing 120 having an open upper end 122 and a closed bottom end 124, and provided with an axial bore 126, dimensioned to telescopically receive the first housing 20.

A shelf, barrier element, or intermediate wall 128 is provided within the second housing engageable with the lower end of the first housing whereby the overall length dimension of the composite unit assembly illustrated in Fig. 6 is substantially equal to the overall length of three batteries disposed in end-to-end relationship, which batteries are replaced by the composite battery-capacitor power unit. Suitable contacts 130 and 132 interconnected by means of conductor 134 are provided, it being noted that contact 130 is provided in intermediate wall 128 to be engaged by contact element 86 of the first housing.

In Figs. 10 and 11, I have illustrated a modified type of contact bar wherein the numerals 140, 142 and 144 designate corresponding and equivalent portions of elements 130, 132 and 134 of Fig. 6.

The housing 120 may comprise a pair of complementary, duplicate, longitudinal half sections permanently secured in facial engagement, wherein lips 141 and 143 in cooperation with conductor bar 144 are adapted to assist in clamping the complementary half shell sections in facial engagement.

From the foregoing, it will be noted that I have thus provided simple, yet highly effective means for converting either a two or three dry-cell battery operated ignition type photoflash lamp assembly over to battery-capacitor operation.

Contact members 76 and 90 resiliently engage contacts 102 and 104 of the battery for thereby retaining it in series circuit with the capacitor, it being understood that contact elements 60 and 86 or 60 and 132 or 142 are constructed and arranged to replace the terminal contacts of the batteries replaced by my power unit.

It should be understood that various changes may be made in the structural details of the device, within the scope of the appended claims, without departing from the spirit of the invention.

What is claimed is:

1. An elongated, substantially tubular housing for a battery and capacitor, said housing comprising a closed upper portion in which a capacitor is fixedly and permanently contained, and an integral open-sided, substantially U-shaped lower portion in which a battery is removably receivable, a contact element projecting outwardly through that end of the upper portion of said housing remote from said lower portion, said contact element in series circuit with one terminal of said capacitor, a second contact element extending from that end of the lower portion of the housing remote from said first mentioned contact element, said second contact element in series circuit with the other terminal of said capacitor, contact members within said lower portion frictionally engageable by the terminals of a battery disposed within said lower portion, and means connecting said contact members in series circuit with the terminals of the capacitor.

2. A battery-capacitor unit of the replaceable battery type, which unit comprises an elongated tubular housing dimensioned to be received within the battery case of a conventional battery operated ignition type photoflash lamp device, said housing including an upper portion in which a capacitor is wholly enclosed, and a lower portion in which a battery is removably receivable, said lower portion including a pair of laterally spaced side walls the lower ends of which are interconnected by a lower wall, contact elements secured to and carried by opposite ends of the housing, said contact elements constructed and arranged to replace the terminal contacts of the batteries replaced by said unit, means connecting said contact elements in series circuit with the terminals of the capacitor, and contact members within said lower portion, each contact member in series circuit with one of the capacitor terminals, said contact members adapted to frictionally engage the axially opposed terminals of a battery inserted therebetween for securely though releasably securing said battery in series circuit with the capacitor and in and against accidental or unintentional displacement from said lower portion.

3. A universal battery-capacitor unit for use with and selectively receivable within the battery case of either a conventional two or three dry-cell battery operated ignition type photoflash lamp device, said unit comprising a first and a second tubular housing, said first housing dimensioned to be received within the battery case of a conventional two dry-cell battery ignition type photoflash lamp device, contact elements secured to and carried by opposite ends of the said first housing constructed and arranged to replace the terminal contacts of the batteries replaced by said first housing, a capacitor and a battery mounted within said first housing, means connecting each contact element in series circuit with a terminal of said capacitor, and means connecting said battery in charging circuit with said capacitor, said second housing having an open and a closed end and dimensioned to be received within the battery case of a conventional three dry-cell battery ignition type photoflash lamp device, said second housing having an axial bore dimensioned to telescopically receive said first housing, means including a contact member in said second housing engageable by one end of the first housing for disposing the other end of the first housing outwardly of and beyond the open end of the second housing, a contact element secured to and carried by the closed end of the second housing, and means connecting said contact member and contact element of the second housing in series circuit, the contact element on the exposed end of the first housing and the contact element of the second housing constructed and arranged to replace the terminal contacts of the batteries replaced by the composite unit comprising said first and second housings.

4. An elongated, substantially tubular housing for a battery of the type which includes a terminal at opposite ends and capacitor of the type which includes a forward terminal and having a metal shell forming a second terminal, said housing comprising an upper portion including substantially continuous side and opposed end walls which define a closed housing for a capacitor receivable therein, and an open-sided, closed ended, substantially U-shaped lower portion integral with and depending from said upper portion for defining an open-sided housing in which a battery is removably receivable, a contact element secured to, carried by and projecting outwardly through that end wall of the upper portion remote from said lower portion, said contact element in series circuit with one terminal of said capacitor, a second contact element secured to, carried by and extending from the free end of the lower portion, said second contact element in series circuit with the other terminal of said capacitor, contact members within and at opposite ends of said lower portion frictionally engageable by the terminals of a battery disposed within said lower portion, that contact member at the outer end of the lower portion in series circuit with said second contact element, the other contact member in series circuit with said first mentioned contact element.

5. An elongated, substantially tubular housing of dielectric material for a battery of the type which includes a terminal at opposite ends and capacitor of the type which includes a forward terminal insulated from and having a metal shell forming a second terminal, said housing comprising a pair of complementary, duplicate, longitudinal half sections secured in facial engagement for defining an upper portion including substantially continuous side and opposed end walls which define a closed housing for a capacitor, and an open-sided, closed ended, substantially U-shaped lower portion integral with and depending from said upper portion for defining an open-sided housing in which a battery is removably receivable, a contact element secured to, carried by and projecting outwardly through that end wall of the upper portion remote from said lower portion, said contact element in series circuit with the second terminal of said capacitor, a second contact element secured to, carried by and extending from the free end of the lower portion, said second contact element in series circuit with the forward terminal of said capacitor, contact members within and at opposite ends of said lower portion, one of said contact members including a first leg located in said closed housing in contact with the metal shell of the capacitor, and a second leg extending through the lower end wall of said upper portion and projecting downwardly into said lower portion for frictional engagement with one terminal of a battery mounted in said lower portion, the other of said contact members including a leg integral with said second contact element projecting upwardly into said lower portion for frictional engagement with the other terminal of a battery mounted in said lower portion.

6. A battery-capacitor power unit comprising an elongated, substantially tubular housing of dielectric material for a battery of the type which includes a terminal at opposite ends and capacitor of the type which includes a forward terminal insulated from and having a metal shell forming a second terminal, said housing comprising a pair of complementary, duplicate, longitudinal half sections permanently secured in facial engagement for defining an upper portion including substantially continuous side and opposed end walls which define a closed housing dimensioned to receive and wholly enclose a capacitor, and an open-sided, closed ended, substantially U-shaped lower portion integral with and depending from said upper portion and defined by a pair of laterally spaced side walls the lower ends of which are permanently interconnected by an integrally formed lower wall for defining an open-sided housing in which a battery is removably receivable, a contact element secured to, carried by and projecting outwardly through that end wall of the upper portion remote from said lower portion, said contact element in series circuit with the second terminal of a capacitor housed within said upper portion, resilient contact members within and at opposite ends of said lower portion, one of said contact members including a first leg located in said closed upper portion in resilient, frictional contact with the metal shell of the capacitor, and a second leg extending through the lower end wall of said upper portion and projecting downwardly into said lower portion for frictional engagement with one terminal of a battery mounted in said lower portion, the other of said contact members including a first leg located in said closed upper portion in frictional contact with the forward terminal of the capacitor therein, a second leg housed within one of the side walls of said U-shaped lower portion, and a third leg overlying the outer face of the lower wall of said lower portion, said third leg comprising the second contact element of the unit, a resilient contact member integral with said third leg extending upwardly around the outer edge of said lower wall and projecting upwardly into said lower portion for frictional engagement with the other terminal of a battery mounted in said lower portion.

References Cited in the file of this patent

UNITED STATES PATENTS

| Number | Name | Date |
|---|---|---|
| 2,590,069 | Robinson | Mar. 18, 1952 |